United States Patent [19]
Murakami et al.
[11] Patent Number: 4,563,689
[45] Date of Patent: Jan. 7, 1986

[54] METHOD FOR INK-JET RECORDING AND APPARATUS THEREFOR

[75] Inventors: Kiyotaka Murakami, Hino; Yoshiaki Kimura, Hachioji, both of Japan

[73] Assignee: Konishiroku Photo Industry Co., Ltd., Tokyo, Japan

[21] Appl. No.: 577,142

[22] Filed: Feb. 6, 1984

[30] Foreign Application Priority Data

Feb. 5, 1983 [JP] Japan ................................ 58-18458
Feb. 5, 1983 [JP] Japan ................................ 58-18459

[51] Int. Cl.⁴ ........................................ G01D 15/18
[52] U.S. Cl. ............................ 346/1.1; 346/140 R
[58] Field of Search ............................ 346/140, 1.1

[56] References Cited

U.S. PATENT DOCUMENTS

| | | | |
|---|---|---|---|
| 4,104,646 | 8/1978 | Fischbeck | 346/140 |
| 4,266,232 | 5/1981 | Juliana | 346/140 |
| 4,409,596 | 10/1983 | Ishii | 346/140 X |
| 4,424,520 | 1/1984 | Matsuda | 346/140 |
| 4,459,599 | 7/1984 | Ort | 346/140 |
| 4,492,968 | 1/1985 | Lee | 346/140 |

*Primary Examiner*—Joseph W. Hartary
*Attorney, Agent, or Firm*—Frishauf, Holtz, Goodman and Woodward

[57] ABSTRACT

An on-demand-type ink jet recording apparatus and process wherein the droplet size is controlled to effect halftone-gradiation recording. A preceding pulse is applied to the electromechanical transducer prior to the main pulse so as to control the position of the ink meniscus in the nozzle and thereby control droplet size.

14 Claims, 21 Drawing Figures

FIG. 4a
FIG. 4b
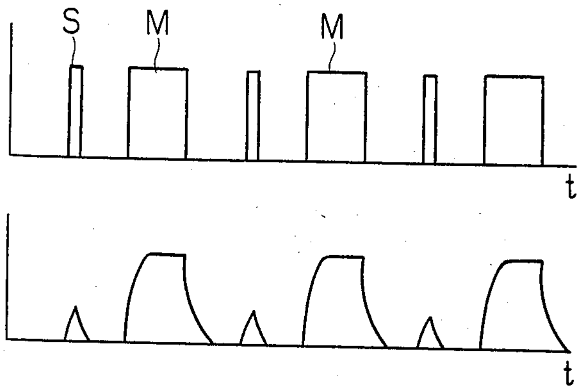
FIG. 5
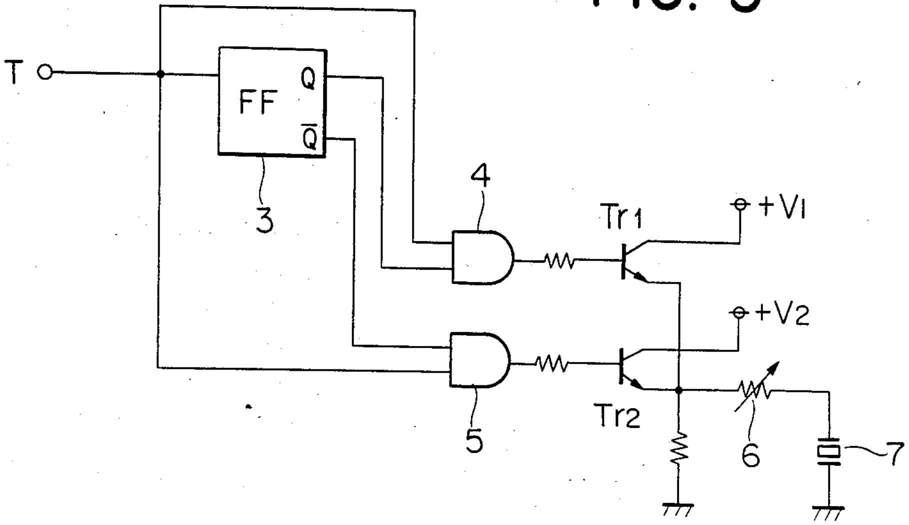
FIG. 6
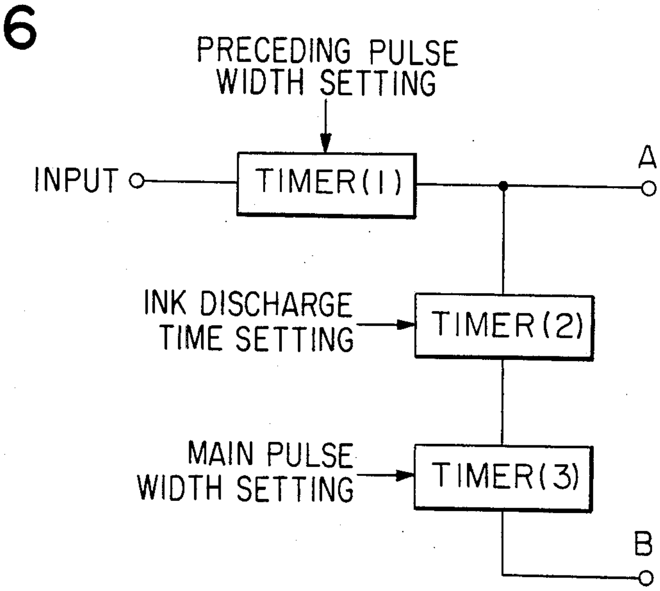

METHOD FOR INK-JET RECORDING AND APPARATUS THEREFOR

BACKGROUND OF THE INVENTION

1. Field of the Invention

The present invention relates to an ink-jet recording apparatus which comprises an electromechanical transducer and a nozzle-having ink chamber and which is so constructed that the electromechanical transducer is driven by a pulse voltage to put pressure upon the nozzle-having ink chamber to thereby eject ink droplets from the nozzle, and more particularly to an on-demand-type ink-jet recording apparatus which is capable of making high-quality gradation and color image recordings.

2. Description of the Prior Art

Firstly, existing ink-jet recording apparatus of the prior art is summarized below:

When pressure is put on a nozzle-having liquid chamber so as to contract the inside volume thereof, the liquid inside the liquid chamber is compressed in the form of fluid droplets from the nozzle provided to the liquid chamber.

If an ink is used as the liquid inside the chamber and a recording medium (e.g., a sheet of recording paper) is provided in front of the nozzle, and if the above operation takes place in accordance with a recording signal (pulse voltage), then the ink droplets ejected from the nozzle strike the recording sheet to thereby record ink dots thereon. In this operation, for example, if a recording sheet is moved in the vertical direction and the nozzle is moved in the lateral direction, then any desired patterns such as character or letter patterns, etc., consisting of ink dots can be recorded on the whole area of a recording sheet.

Such the recording apparatus as in above, as the on-demand type ink-jet recording apparatus, is already on the market. The on-demand-type ink-jet recording apparatus is not one that records ink dots on a recording sheet by the wire impact as in the case of wire-dot-type printers but one in which ink 2 supplied in an ink chamber 3 through an ink supplying passage 4 as in FIG. 1(*a*) is ejected in the form of ink droplets from nozzle 1, and the droplets strike a recording sheet to thereby form ink dots thereon, so that the recording operation can be carried out very quietly. And mechanically driving means necessary for the recording operation are simple and small in the number thereof, so that the apparatus can be easily constructed of a compact type. Further, as the means for putting pressure upon the ink liquid, if such an electromechanical transducer as, for example, a piezoelectric element 7 is used which is made of piezoelectric crystals such as barium titanate ceramics (under the trade name "PZT" available commercially from Clevite Corporation, Cleveland, Ohio), or the like, then the recording can take place in a short period of time.

That is, the on-demand-type ink-jet recording apparatus is capable of recording information much more noiselessly and faster than does the wire-dot-type printer, and being of a compact construction. Further, a plurality of ink liquids different in color can be used to make superposed printings at same points on a recording sheet to thereby make multicolor recordings comprising not only the respective inks' own colors but also their mixed colors.

In the on-demand-type ink-jet recording apparatus, in order to record high-density and high-resolution information on a recording sheet, it is necessary to minimize the size of each of the dots to be recorded on the recording sheet. For this purpose, the size of each of the ink droplets ejected from the nozzle must be minimized.

If graphical images are to be recorded on a recording sheet, the density needs to be changed by multiple stages. For the multistage change in the density there may be used a method to change the number of ink dots per unit area on a recording sheet. A high-density record can be obtained by increasing the number of ink dots, while a low-density record can be obtained by reducing the number of ink dots. However, the use of this method alone has its limit to the representation of halftone gradation. To change the density by multiple stages, the number of ink dots per unit area on a recording sheet should be varied along with controlling the diameter of each of the ink dots to be recorded on the recording sheet.

Namely, in the on-demand-type ink-jet recording apparatus, in order to record high-density, high-resolution and multistage-density information on a recording sheet, it is desirable that the size of each of the ink droplets ejected from the nozzle be freely controllable at need from much smaller sizes to larger sizes. Minimization of the size of the droplet from the nozzle is considered carried out by making smaller the diameter of the nozzle orifice, but if the diameter of the nozzle orifice is made smaller, the nozzle tends to become clogged with increasing the friction of the ink liquid with the nozzle, so that the ink liquid becomes hardly ejected from the nozzle. For this reason, there is naturally a limit to making small the nozzle orifice. And making small the diameter of the nozzle orifice, although it reduces the size of the ink droplet to a certain extent, cannot freely controll the size.

For increasing the density of information to be recorded on a recording sheet there is also another method, which utilizes "satelite" droplets that are secondarily formed behind and smaller than the main ink droplets when ejected from the nozzle. The main ink droplets and satelite ink droplets are ejected in the same direction from the nozzle, so that the points on a recording sheet where these droplets strike are the same if no manipulation is applied thereto. In order to change the size of the ink droplet to be recorded on a recording sheet, the main droplets and the satelight droplets should be properly used separately, and the satelite droplets alone must be used for the small-size dot recording with a manipulation to prevent the main droplets from arriving at the recording sheet. For this reason, the apparatus requires means for charging the main droplets to deflect the same and a device for the recovery of the unused main droplets, thus causing the apparatus to become of a large size. Since the satelite droplets are ones secondarily produced when the main droplets are ejected from the nozzle, the size thereof cannot be freely controlled. The diameter of each of the ink dots to be formed on a recording sheet, although there is a change in the size due to the difference between the main droplets and the satelite droplets, cannot be variably controlled.

Subsequently, in an attempt to freely change the size of the ink droplet to control the size of each of the ink dots to be formed on a recording sheet there was devised a device for changing the magnitude (height) of a pulse voltage applied to an electromechanical transducer to change pressure put on the ink liquid inside the ink chamber to thereby control the size of the ink droplet from the nozzle. This is an attempt to control the ink droplet size according to the pulse voltage level and it is based on the idea that if pressure to be put on the ink liquid is larger, then the droplet size from the nozzle is larger, while if the pressure is smaller, then the droplet size from the nozzle is smaller.

However, according to this device, the ink droplet size-changeable range is narrow, and it has been found that it is difficult for the device to form ink droplets of a certain size. The ink chamber, electromechanical transducer, and the like, which constitute the ink-jet printer head, have their own intrinsic oscillation frequencies. If the oscillation frequency produced by the pulse voltage applied to the electromechanical transducer is not coincident with the foregoing intrinsic oscillation frequency, then the applied pressure causes ink droplets to be efficiently ejected in a uniform size from the nozzle, but if the oscillation frequency produced by the pulse voltage applied to the electromechanical transducer is close to resonance frequency, then the oscillation frequency is attracted to the resonance frequency, whereby the ink droplet ejection from the nozzle becomes unstable. This is considered to be the cause of narrowing the ink droplet size-changeable range. Accordingly, even if the pulse voltage to be applied to the electromechanical transducer were changed to thereby change pressure put on the ink liquid, the ink droplet size from the nozzle would be unable to be changed arbitrarily, so that the dots to be formed on a recording sheet is not controllable freely.

As has been described, existing techniques of the prior art are unable to control freely the size of the droplet ejected from the nozzle, and thus unable to control the size of the dot to be formed on a recording sheet.

As a result of our investigation, we have found out that even where the same pulse voltage is applied to the electro-mechanical transducer, the tip position of the ink liquid inside the nozzle at the time when the pulse voltage is applied has relation to the size of the droplet.

Namely, even if the same pulse voltage were applied to the electromechanical transducer, the droplet ejected from the nozzle would become different in the size between when nozzle 1 is filled with an ink liquid 2 so that the tip end position of ink liquid 2 comes up to the orifice of nozzle 1 as shown in FIG. 1(*b*) and when the tip position of ink liquid 2 inside nozzle 1 is at a distance l from the orifice of nozzle 1 as shown in FIG. 1(*c*).

If the size of the ink droplet is taken on the axis of ordinate and the distance l between the nozzle orifice and the tip position of the ink liquid is taken on the axis of abscissa, even when the same pulse voltage is applied, the ink droplet size changes as given in FIG. 2.

OBJECT AND SUMMARY OF THE INVENTION

It is therefore an object of the present invention to provide an on-demand-type ink-jet recording apparatus which is designed so as to change continuously and stably the ink droplet size over a wide range to thereby enable to effect high-quality halftone-gradation recordings.

We considered that if the control of the tip position of the ink liquid inside the nozzle is made before applying the main pulse voltage for the formation of the ink droplet to be ejected from the nozzle, then the ink droplet size can be changed freely, whereby the dot size to be recorded on a recording sheet can be controlled freely. Thus we have made the present invention.

In an on-demand type ink-jet recording apparatus which comprises an ink-jet printer head comprising an ink chamber and provided thereon an electro mechanical transducer to which an electric pulse is to be applied to eject an ink droplet (hereinafter referred to as "main pulse"), a nozzle from which said ink droplet is to be ejected and an ink supplying passage through which said ink is supplied to the ink chamber, the improvement characterized in that said inkjet recording apparatus comprises a means for applying to said electro mechanical transducer at least one electric pulse (hereinafter referred to as "preceding pulse") prior to said main pulse so as to variably control the position of ink meniscus in the nozzle, said preceding pulse not having enough energy for the ink to be ejected from the nozzle.

BRIEF DESCRIPTION OF THE DRAWINGS

FIG. 4(*a*) and (*b*) are drawings showing the input pulse waveform and driving pulse waveform, respectively, when applying an advance pulse voltage, in an example of the present invention.

FIG. 5 is an electric circuit diagram in an example of the present invention.

FIG. 6 is a system diagram in an example of the present invention.

DETAILED DESCRIPTION OF THE INVENTION

The present invention will be illustrated in detail by the following examples with reference to the drawings.

The electromechanical transducer for putting pressure on the ink liquid uses a piezoelectric crystal element.

Figure 1A:
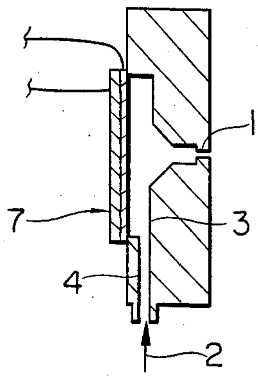
(PRIOR ART) FIG. 1a
FIG. 1(*a*) is a cross-sectional view of the recording head of an ink-jet recording apparatus, and FIG. 1 (*b*) and (*c*) are cross-sectional views of the recording head for comparison of the difference in the tip position of the ink liquid inside the nozzle.
Figure 1B:
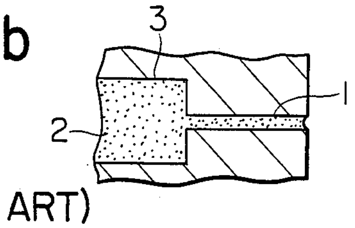
(PRIOR ART) FIG. 1b
Figure 1C:
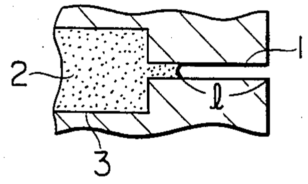
(PRIOR ART) FIG. 1c
Figure 3A:
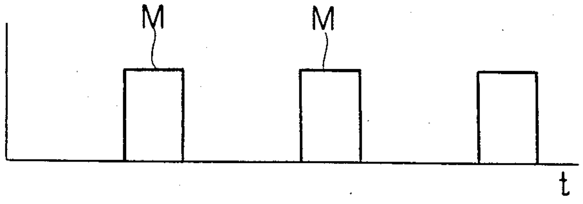
(PRIOR ART) FIG. 3a
FIG. 3(*a*) and (*b*) are drawings showing the input pulse waveform and driving pulse waveform, respectively, in an example of conventional apparatus.
Figure 3B:
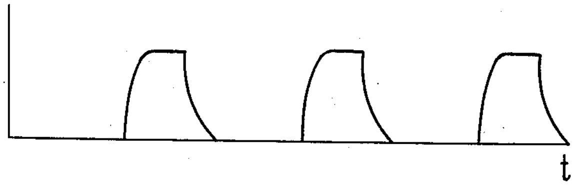
(PRIOR ART) FIG. 3b

FIG. 3 shows input pulse waveform (a) and driving pulse waveform (b) for applying a pulse voltage to the piezoelectric crystal (e.g., 7 of FIG. 1(*a*)) to eject ink droplets from a nozzle in an example of conventional apparatus.

When a pulse signal M as shown in FIG. 3(*a*) is fed to apply a pulse voltage to a piezoelectric crystal, the voltage between both plates of the piezoelectric crystal becomes of a voltage waveform as shown in FIG. 3(*b*) similar to the charge and discharge characteristics of a capacitor. By the application of the pulse voltage, the piezoelectric crystal becomes strained, and the strain puts pressure upon the ink liquid to thereby eject ink droplets from the nozzle, and the ink droplets strike a recording sheet to form ink dots thereon.

FIG. 4 shows input pulse waveform (a) and driving pulse voltage waveform (b) in an example of the present invention.

Preceding pulse voltage S for changing the tip position of the ink liquid inside a nozzle is applied prior to main pulse voltage M to the piezoelectric crystal. The piezoelectric crystal becomes strained by the preceding pulse voltage S to put pressure upon the ink liquid. This pressure, because the applying period of the preceding pulse voltage to the piezoelectric crystal is short, pushes merely once the ink liquid slightly outward, but then draws the ink liquid back to begin damping oscillation, so that no ink droplets are ejected from the nozzle. When the ink liquid is oscillated, the oscillation is transmitted to the ink liquid inside the nozzle, and then the tip of the ink liquid repeats reciprocating motion inside the nozzle. If main pulse M is applied to the piezoelectric crystal at an appropriate point of time during the repetition of the reciprocating motion, from the nozzle is ejected an ink droplet of the size corresponding to the tip position of the ink liquid.

An electric circuit for realizing the above-described operation is shown in FIG. 5.

In this electric circuit, when an preceding pulse voltage signal as shown in FIG. 4(*a*) is fed to input terminal T, because the input terminal T is connected to the input terminal of flip-flop (FF) 3 and one of the input terminals of AND circuits 4 and 5, the output Q of flip-flop 3 becomes "H" and this output is then fed to the other input terminal of AND circuit 4, and then the output from AND circuit 4 becomes "H." When the output from AND circuit 4 becomes "H," transistor $Tr_1$ is turned on, and voltage $V_1$ applied to the collector of transistor $Tr_1$ is then applied through variable resistor 6 to piezoelectric crystal 7. When this voltage is applied to piezoelectric crystal 7, the ink liquid oscillates, then the tip end of the ink liquid inside the nozzle repeats its reciprocating motion inside the nozzle. When preceding pulse signal S becomes nil, the output Q from flip-flop 3 becomes "L." And, on the contrary to the above, transistor $Tr_1$ is turned off, and the voltage to be applied to piezoelectric crystal 7 also becomes nil.

Subsequently, when main pulse voltage signal M as shown in FIG. 4(*a*) is fed to input terminal T, the output $\overline{Q}$ from flip-flop 3 becomes "H," which is then fed to the input terminal of AND circuit 5, and the output from AND circuit 5 becomes "H." When the output "H" is fed to the base of transistor $Tr_2$, the transistor $Tr_2$ is then turned on, and the $V_2$ applied to the collector is applied through variable resistor 6 to piezoelectric crystal 7. The applying period of main pulse voltage M is longer than that of preceding pulse voltage S, so that piezoelectric crystal 7 is also largely deformed to thereby eject ink droplets from the nozzle. The size of the ink droplet ejected at this point of time is determined according to the tip position of the ink liquid which is repeating its reciprocating motion inside the nozzle.

In the nozzle construction of the ink-jet recording apparatus constructed as described above, the means for controlling the ink droplet size will be explained below:

In order to control the ink droplet size, it is necessary to change the preceding pulse voltage and/or the pulse width thereof and the time interval until the main pulse voltage is applied after the application of the preceding pulse voltage.

Firstly, the control of the ink droplet size by changing the preceding pulse voltage and the pulse width thereof is described below:

The preceding pulse voltage is a voltage that is applied to piezoelectric crystal 7 in order to oscillate the ink liquid to thereby repeat reciprocating motion of the ink liquid inside the nozzle, and the behavior of the ink liquid is changed by the difference in the pulse height and width of the pulse voltage, so that the period of time required for one reciprocating motion of the ink liquid inside the nozzle becomes changed. Accordingly, the tip position of the ink liquid inside the nozzle, even when settling the time interval between the applications of the preceding pulse voltage and of the main pulse voltage, varies according to the difference in the oscillation frequency, so that the ink droplet size can be controlled by changing the pulse height and width of the preceding pulse voltage.

The control of the ink droplet size by controlling the time interval from the application of the preceding pulse voltage application until the application of the main pulse voltage will then be explained.

By applying the preceding pulse voltage to piezoelectric crystal 7, the ink liquid is oscillated to thereby repeat the reciprocating motion of the ink liquid inside the nozzle. The tip position of the ink liquid inside the nozzle varies according to the difference in the time interval from the application of the preceding pulse voltage until the application of the main pulse voltage, so that the control of the time interval enables to control the size of the ink droplet to be ejected from the nozzle.

In addition, satisfactory results can be obtained under the conditions that the above preceding pulse voltage applying period of time is not more than 50 μsec., and the time interval from the application of the prededing pulse voltage until the application of the main pulse voltage is 500 μsec.

FIG. 6 is a system diagram for controlling the foregoing ink droplet size.

When an input signal is fed to timer (1) that is provided for settling a pulse width of the preceding pulse voltage, a pulse width-controlled output is applied to the input terminal of timer (2) that is provided for controlling the time interval from the application of the preceding pulse voltage until the application of the main pulse voltage. The timer (2), in a lapse of a fixed period of time after receiving an input from timer (1), feeds an output to timer (3) that is provided for the purpose of controlling the pulse width of the main pulse voltage. The timer (3), when receiving the input from timer (2), puts out a pulse signal having the same pulse width as of the main pulse voltage for a fixed period of time.

Figure 7:
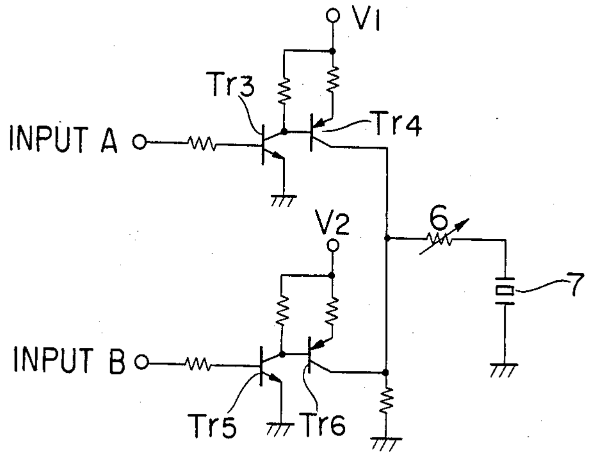
FIG. 7 is an electric circuit diagram in another example of the present invention.

FIG. 7 is an electric circuit diagram for driving the piezoelectric crystal by the pulse signal from the above system diagram.

The input terminal A in FIG. 7 is connected to the output terminal of the timer (1) in FIG. 6. When to the input terminal A is fed a pulse signal produced by controlling the pulse width of the preceding pulse voltage by means of timer (1), then transistors $Tr_3$ and $Tr_4$ are turned on, and voltage $V_1$ is applied through variable resistor 6 to piezoelectric crystal 7, thus initiating the reciprocating motion of the tip of the ink liquid inside the nozzle.

And to the input terminal B is fed from timer (3) a main pulse signal produced by controlling the time interval from the application of the preceding pulse signal until the application of the main pulse voltage and the pulse width of the main pulse voltage. When the main pulse signal is fed to input terminal B, then transistors $Tr_5$ and $Tr_6$ are turned on, and voltage $V_2$ is applied through variable resistor 6 to piezoelectric crystal 7, whereby from the nozzle is ejected an ink droplet whose size is determined according to the tip position of the ink liquid inside the nozzle.

The control of the pulse width of the preceding pulse voltage is carried out by timer (1), the control of the preceding pulse voltage is effected by varying $V_1$, the control of the application timing of the main pulse voltage by timer (2), and the control of the applying period of the main pulse voltage by timer (3). Of these, one control or controls in combination of them enable to control the size of the ink droplet ejected from the nozzle.

Figure 8A:
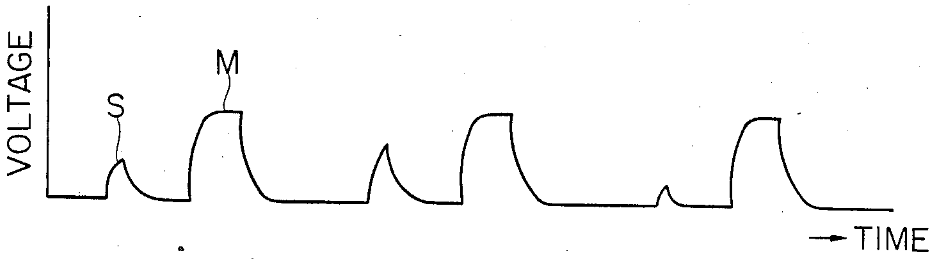
FIG. 8(*a*), (*b*), and (*c*) are the waveform drawings of signals to be applied to a piezoelectric crystal.
Figure 8B:
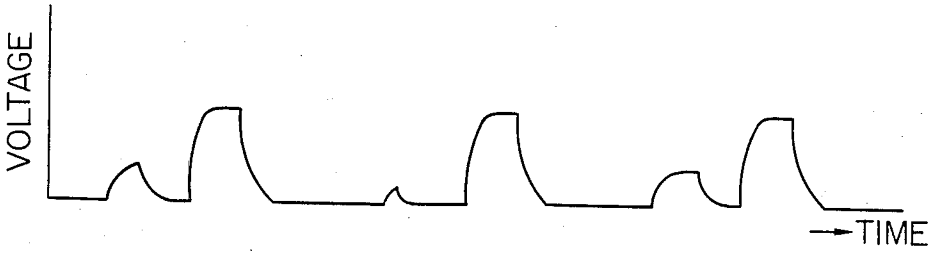
Figure 8C:
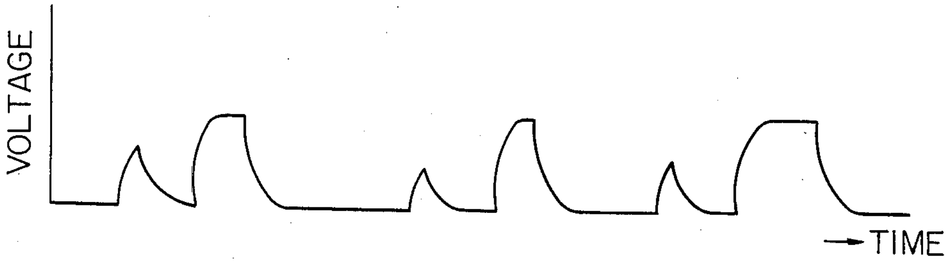

FIG. 8 shows the waveforms of the preceding pulse voltage and main pulse voltage that are applied to piezoelectric crystal 7 by controlling the foregoing timers (1), (2) and (3) and $V_1$.

FIG. 8(*a*) shows the waveform in the case where the voltage value of the preceding pulse voltage is changed, while FIG. 8(*b*) shows the waveform where the pulse width of the preceding pulse voltage is changed. Further FIG. 8(*c*) shows the waveform in the case where the voltage value and pulse width of the preceding pulse voltage and the pulse width of the main pulse voltage are changed, respectively.

Figure 9A:
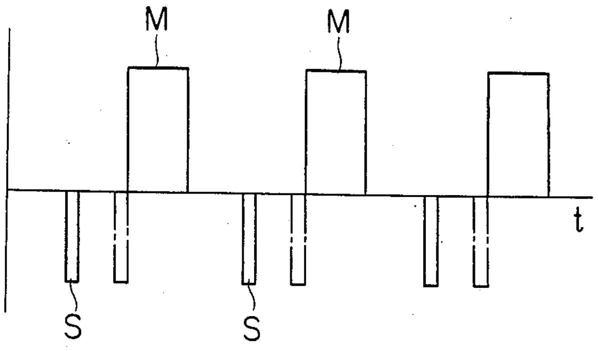
FIG. 9(*a*) and (*b*) are drawings of the input pulse waveform and driving pulse waveform, respectively, when applying an preceding pulse voltage, in another example of the present invention.
Figure 9B:
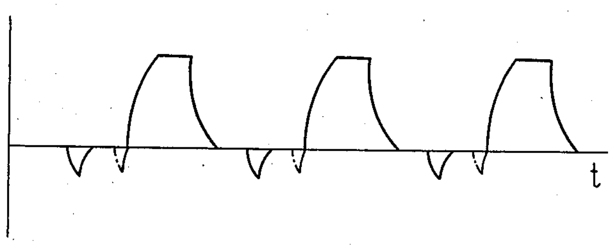

Input waveform (a) and driving pulse waveform (b) in accordance with another example of the present invention are shown in FIG. 9.

Figure 2:
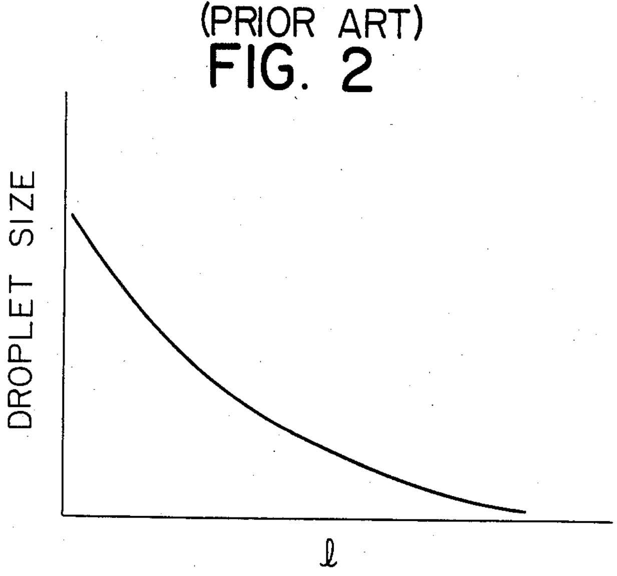
(PRIOR ART) FIG. 2
FIG. 2 is a graph showing the change in the ink droplet size in accordance with the difference in the tip position of the ink liquid.

In order to vary the tip position of the ink liquid inside the nozzle, preceding pulse voltage S of the polarity opposite to that of main pulse voltage M is applied prior to main pulse voltage M to piezoelectric crystal 7. Since preceding pulse voltage S is of the polarity opposite to that of main pulse voltage M, only when applying the former the straining direction of the piezoelectric crystal becomes inverse. If the piezoelectric element is provided to the ink chamber so that the volume of the ink chamber contracts when main pulse voltage M is applied, when the preceding pulse voltage of the opposite polarity is applied the piezoelectric element is strained in a direction toward increasing the volume of the ink chamber for a period of time alone of corresponding to the voltage application. The increase in the volume of the ink chamber by the application of the preceding pulse voltage reduces the pressure inside the ink chamber to thereby draw the ink liquid inside the nozzle back toward the ink chamber side. And when preceding pulse voltage S that has been applied to the piezoelectric crystal is stopped, the piezoelectric element is no longer strained to tend to return to its original form to thereby then put pressure upon the ink liquid. The pressure that has been put upon the ink liquid pushes the ink liquid inside the nozzle toward the nozzle orifice. The piezoelectric element, when preceding pulse voltage becomes nil, returns to its original form and stops not as it is but with damping oscillation. The oscillation of the piezoelectric element affects the pressure put upon the ink liquid, so that the ink liquid inside the nozzle repeats its reciprocating motion inside the nozzle. If main pulse voltage M that forms ink droplets is applied to the piezoelectric crystal at an appropriate point of time during the repetition of the reciprocating motion of the ink liquid inside the nozzle, a droplet having its size corresponding to the tip position of the ink liquid is ejected from nozzle 1 as shown in FIG. 2.

In addition, in FIG. 9, preceding pulse voltage S, as indicated with the alternate long and short dash lines, may be applied immediately before main pulse voltage M, and in this instance, main pulse M is applied right after the drawing back of the ink liquid inside the nozzle, thereby ejecting ink droplets.

Figure 10A:
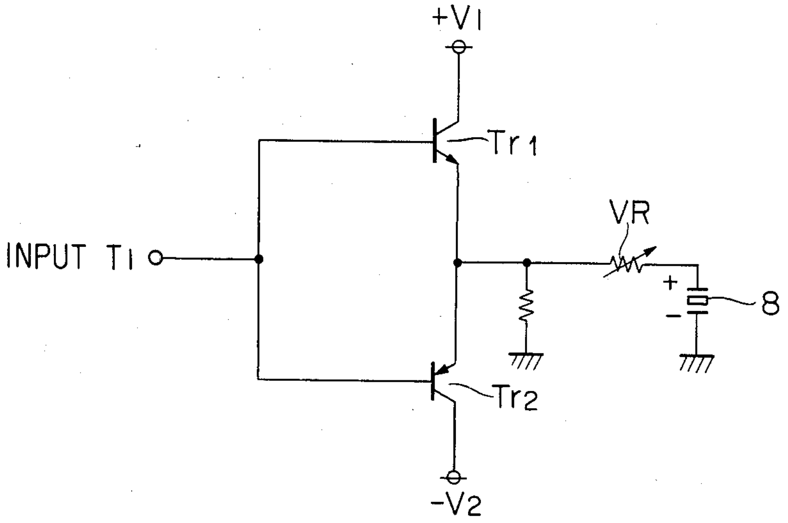
FIG. 10(*a*) and (*b*) are electric circuit diagrams in the preceding example of the present invention.
Figure 10B:
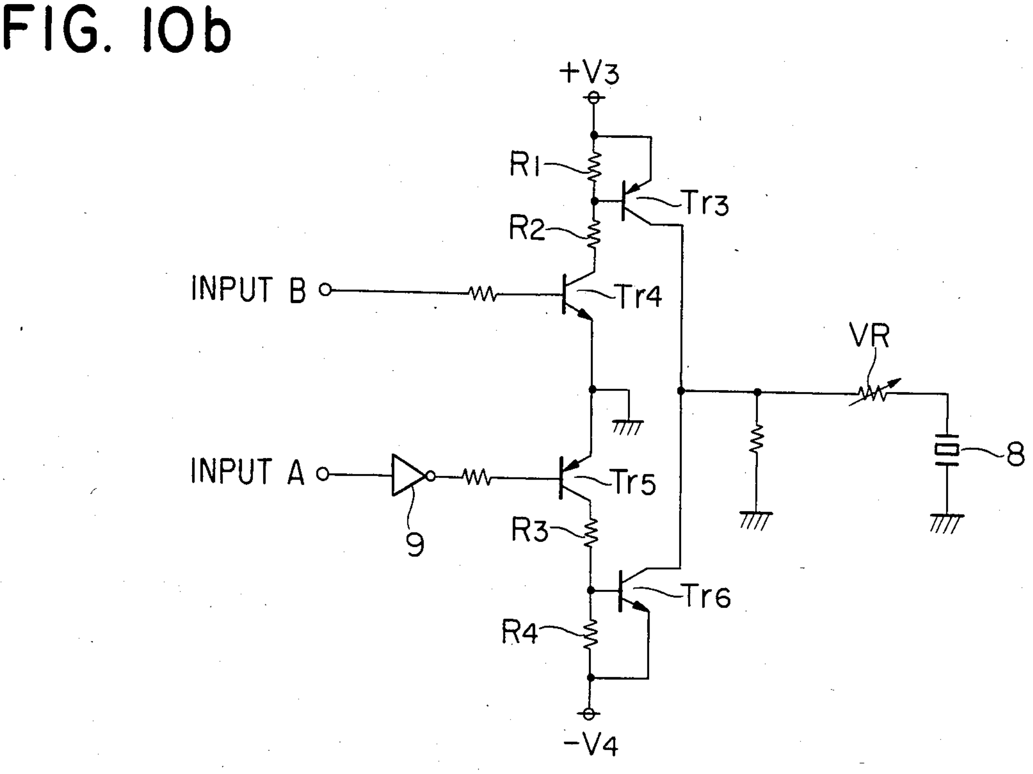

An electric circuit diagram for the purpose of realizing the above operation is shown in FIG. 10.

The electric circuit of FIG. 10(*a*) is one that is constructed as a push-pull circuit system, wherein when preceding pulse voltage signal S of the polarity opposite to the polarity of main pulse voltage M as shown in FIG. 9(*a*) is applied to input terminal $T_1$, then a negative voltage is applied to the base of transistor $Tr_2$, whereby transistor $Tr_2$ is turned on. When transistor $Tr_2$ is turned on, voltage $V_2$ of the polarity opposited to that of piezoelectric crystal 8 is applied through variable resistor $V_R$ to piezoelectric crystal 8. The piezoelectric crystal becomes strained by applying voltage $V_2$ thereto, then the preceding pulse signal becomes nil, and when the signal becomes nil, the crystal tends to return to its original form. The thus produced oscillation causes the ink liquid inside the nozzle to repeat its reciprocating motion inside the nozzle.

Next, when the main pulse voltage signal is fed to input terminal $T_1$, transistor $Tr_1$ is turned on, and voltage $V_1$ is applied through variable resistor $V_R$ to piezoelectric crystal 8. The applying period of main pulse voltage M is longer than that of preceding pulse voltage S, so that piezoelectric crystal 8 becomes largely changed to thereby eject ink droplets from the nozzle. And the thus produced ink droplet size is determined according to the tip position of the ink liquid repeating its reciprocating motion inside the nozzle. In addition, the foregoing preceding pulse voltage S is applied to the piezoelectric crystal in a proportion of at least one to one main pulse voltage M.

FIG. 10(*b*) shows an electric circuit diagram in accordance with another example different from the above electric circuit.

In the electric circuit shown in FIG. 10(*a*), to input terminal $T_1$ is applied the preceding pulse signal and the main pulse signal. And distinction between the preceding pulse signal and the main pulse signal is made according to the difference in the polarity between them. However, in the electric circuit shown in FIG. 10(*b*), the input terminals for the preceding pulse signal and for the main pulse signal are provided separately, and both preceding pulse signal and main pulse signal are fed in the same polarity to thereby further secure the driving of the piezoelectric crystal.

When an preceding pulse signal (positive polarity) is applied to input terminal A, a negative voltage that has been inverted by inverter 9 is applied to the base of transistor $Tr_5$. When the base of transistor $Tr_5$ is turned negative, the transistor $Tr_5$ is turned on, and an electric current then runs through transistor $Tr_5$ and resistors $R_3$ and $R_4$. The electric current running at this time through resistor $R_4$ produces a voltage between both ends of resistor $R_4$, and this voltage is applied to between the base and emitter of transistor $Tr_6$, whereby the transistor $Tr_6$ is turned on. When the transistor $Tr_6$ is turned on, to piezoelectric crystal 8 is applied voltage $V_4$ of the polarity opposite to that of the piezoelectric crystal, whereby the ink liquid is drawn back to thereby make its reciprocating motion inside the nozzle. Subsequently, when a main pulse signal is fed to input terminal B, transistor $Tr_4$ is turned on, and an electric current runs through resistors $R_1$ and $R_2$ to transistor $Tr_4$ to produce a voltage between both ends of resistor $R_1$, whereby transistor $Tr_3$ is turned on. When the transistor $Tr_3$ is turned on, voltage $V_3$ is applied through variable resistor $V_R$ to piezoelectric crystal 8 to thereby eject ink droplets from the nozzle. In the electric circuit 10(*b*) the input terminals A and B are all drivable by TTL (transistor transistor logic) level signal, so that its computer control can easily be made.

In the nozzle construction of the above-constructed ink-jet recording apparatus, the means for controlling to change the ink droplet size into various sizes will be described below:

In order to control the ink droplet size, it is necessary to change the preceding pulse voltage and/or the pulse width thereof and the time interval between the applications of the preceding pulse voltage and of the main pulse voltage.

Firstly, the control of the ink droplet size by changing the preceding pulse voltage (i.e., ampliture) and the pulse width thereof will be explained.

The preceding pulse voltage is a voltage that is applied to the piezoelectric crystal in order to draw back or to oscillate the ink liquid to thereby make the reciprocating motion of the ink liquide inside the nozzle, and the behavior of the ink liquid changes according to the difference in the pulse height and width of the preceding pulse voltage, the said behavior change including the change in the tip position of the ink liquid and the change in the period necessary for effecting one reciprocating motion of the ink liquid inside the nozzle.

Figure 11A:
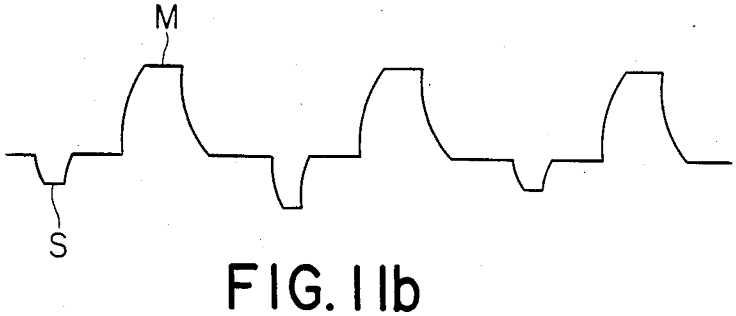
FIG. 11(*a*) and (*b*) are drawings of signal waveforms to be applied to a piezoelectric crystal in the preceding example of the present invention.
Figure 11B:
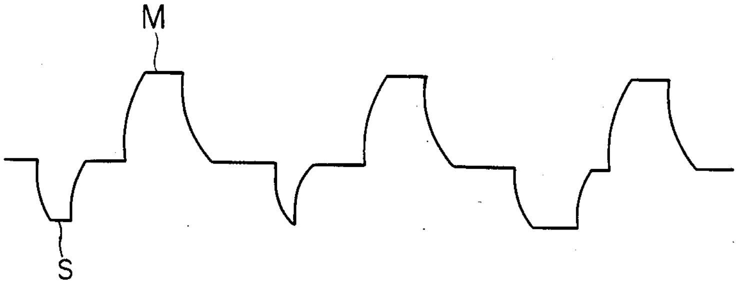

Therefore, although the time interval between the applications of the preceding pulse voltage and of the main pulse voltage is fixed, the tip position of the ink liquid inside the nozzle differs, so that by controlling the pulse height and width of the preceding pulse voltage, the ink droplet size can be controlled (see FIG. 11(*a*) and (*b*)). FIG. 11(*a*) shows the waveform in the case where the voltage value of the preceding pulse voltage is changed, while FIG. 11(*b*) is the waveform where the pulse width of the preceding pulse voltage is changed. For example, where the preceding pulse voltage is from $-1$ to $-150$ V and the pulse width thereof is not more than 500 $\mu$sec., satisfactory results can be obtained.

A system diagram for the above-described control of the ink droplet size is as shown in FIG. 6.

That is, when an input is fed to timer (1) that is provided for settling the pulse width of the preceding pulse voltage, a pulse width-controlled output is fed to the input terminal of timer (2).

The timer (2) is a timer that is provided for controlling the time interval between the applications of the preceding pulse voltage and of the main pulse voltage (i.e., ink droplet ejecting period). In a given lapse of time after receiving an input from timer (1) the timer (2) produces an output to be fed to timer (3) that is provided for controlling the pulse width of the main pulse voltage. The timer (3), upon receiving the output from timer (2), produces a pulse signal having the pulse width of the main pulse voltage. This signal is fed to input terminal B of the electric circuit as shown in FIG. 10(*b*), and the output from timer (1) is fed to input terminal A, whereby the pulse width of the preceding pulse voltage, the time interval between the applications of the preceding pulse voltage and of the main pulse voltage, and the pulse width of the main pulse voltage are controlled, respectively. And if the height or amplitude of the preceding pulse voltage is determined by varying the $V_4$ of FIG. 10(*b*), then ink droplets of any desired size can be ejected from the nozzle.

Figure 12:
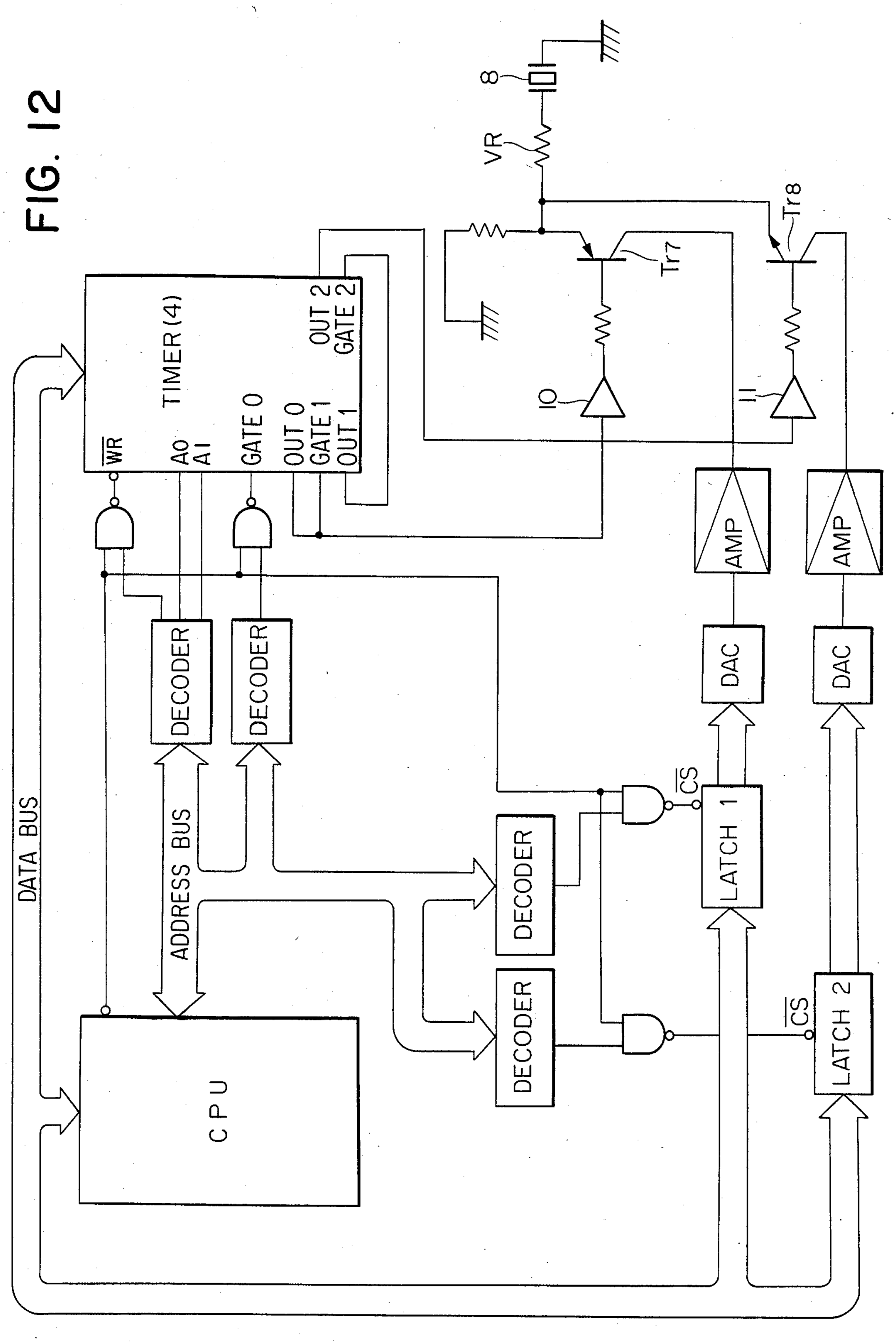
FIG. 12 is a diagram of the example of the present invention, wherein a microprocessor is used.

FIG. 12 shows an example of the present invention where a microprocessor is used to control the preceding pulse voltage and the pulse width thereof, the time interval between the applications of the preceding pulse voltage and of the main pulse voltage, and the pulse width of the main pulse voltage.

This example comprises a central processing unit CPU (I8085 is used in this example) that commands every component part of the system in accordance with a program, a control circuit that controls the voltage to be applied to piezoelectric crystal 8 in accordance with an instruction from the CPU, timer (4) (i8253 is used in this example) that controls the pulse time in accordance with an instruction from the CPU, and a driver circuit for piezoelectric crystal 8.

Firstly, the controls of the preceding pulse voltage and of the main pulse voltage will be explained.

The CPU instructs latches 1 and 2 on the voltage to be applied to piezoelectric crystal 8. And the timing of the voltage application is also fed from the CPU to the $\overline{CS}$ of each of latches 1 and 2. Latches 1 and 2 each, therefore, puts out a signal telling when what voltage should be applied to piezoelectric crystal 8. The output from each of the latches is a digital signal. The signals are converted into analog signals by D/A transducer (DAC), and the analog signals are amplified by amplifiers (Amp) and then fed to the collectors of transistors $Tr_7$ and $Tr_8$, respectively. The transistor $Tr_7$ is one that is provided for making on-off control to determine whether or not to apply the advance pulse voltage to piezo-electric crystal 8. If this transistor $Tr_7$ is turned on, the voltage applied to the collector (i.e., the peceding pulse voltage controlled in accordance with the instruction from CPU) is applied in the opposite polarity through variable resistor $V_R$ to piezoelectric crystal 8.

On the other hand, transistor $Tr_8$ is one that is provided for making on-off control to determine whether or not to apply the main pulse voltage to piezoelectric crystal 8, and if this transistor $Tr_8$ is turned on, then the main pulse voltage controlled by CPU is applied in the positive polarity through variable resistor $V_R$ to piezoelectric crystal 8. By the above operations the preceding pulse voltage and the main pulse voltage are controlled.

The controls of the pulse width of the preceding pulse voltage and of the time interval from the application of the preceding pulse voltage until the application of the main pulse voltage will be explained.

When an instruction on the pulse width of the preceding pulse voltage from CPU is fed to GATE 0 of timer (4), an preceding pulse voltage signal having a pulse width in accordance with the instruction is put out from OUT 0, and this is applied through buffer circuit 10 to the base of transistor $Tr_7$. The transistor $Tr_7$ is then turned on for a period alone corresponding to the pulse width instructed by CPU. When transistor $Tr_7$ is turned on, the voltage controlled by latch 1 connected to the collector is applied in the opposite polarity through variable resistor $V_R$ to piezoelectric crystal 8.

The time interval from the application of the main pulse voltage until the application of the main pulse voltage is controlled as follows:

OUT 0 terminal of timer (4) is connected to GATE 1 terminal. When an preceding pulse voltage signal is put out from OUT 0, a control signal for the time interval between the applications of the preceding pulse voltage and of the main pulse voltage is fed to GATE 2 of timer (4), and then from GATE 2 of timer (4), in a given lapse of time after the output of the preceding pulse voltage signal, is put out a main pulse voltage signal whose pulse width is controlled by CPU, and this output is fed to the base of transistor $Tr_8$ to thereby turn transistor $Tr_8$ on. When the transistor $Tr_8$ is turned on, the collector voltage controlled by latch 2 is applied in the positive polarity through variable resistor $V_R$ to piezoelectric crystal 8 to thereby eject ink droplets from the nozzle.

Existing techniques of the prior art are capable of changing to some extent the size of the ink droplet ejected from the nozzle, but unable to control the droplet to be of any desired size, and therefore unable to make high-density and high-resolution information recordings. Particularly the half-tone representation required for graphical images, in prior-art techniques, cannot but be made only in the manner of changing the number of dots per unit area on a recording sheet.

For the multicolor recording, it is necessary to superpose different colors at same points on a recording sheet. In the case of making color-superposed printings by prior-art techniques, superposedly printed color dots tends to become larger in the diameter than single-color printed dots, so that no clear multicolor image recording can be performed.

In contrast, the present invention is capable of controlling freely the size of the droplet ejected from the nozzle by applying preceding pulse voltage of the opposite polarity prior to applying the main pulse voltage.

Thus, high-density, high-resolution recordings can be carried out by reducing the size of the ink droplet ejected from the nozzle and printing on a recording sheet a large number of size-reduced dots. And halftone gradation representation can be made sufficiently by not only changing the number of dots per unit area on a recording sheet but also changing the dot size into various sizes. The present invention, therefore, is much excellent in the representation of halftone gradation as compared to prior-art techniques.

In the color-superposed printing which is necessary for the multicolor recording, by use of smaller-size ink droplets at points where different colors should be superposed, the diameter of the multicolor-superposed dot can be made almost equal to that of the single color-printed dot. Thus excellent multicolor recordings can be made.

Further, even when the same droplet size is used there are cases where the printed dot size varies according to the paper quality used. Prior-art techniques are unable to print always equal size dots on various papers different in quality because of being unable to control the droplet size.

The present invention is capable of controlling the ink droplet size freely, so that even when recording sheet's quality is changed, the invention can always print dots in a uniform size.

An ink having such a nature that when its droplet strikes a recording sheet the recorded dot size becomes excessively large has been unable to be used up to now, but in the present invention, the droplet size can be made small, so that the ink's selectable range has become extended.

What is claimed is:

1. In an on-demand type ink-jet recording apparatus which comprises:

an ink-jet printer head including an ink chamber, an electro-mechanical transducer coupled to said ink chamber, a nozzle in communication with said ink chamber and from which said ink droplet is to be ejected and an ink supplying passage through which said ink is supplied to the ink chamber; and means for applying a main electrical pulse to said electro-mechanical transducer to eject an ink droplet, the improvement comprising:

applying means for applying to said electro-mechanical transducer at least one preceding electrical pulse prior to application of said main pulse so as to variably control the position of the ink meniscus in the nozzle to correspondingly variably control the size of the ink droplet to be ejected responsive to said main pulse;

said applying means including means for varying the energy of said at least one preceding pulse; and said at least one preceding pulse having insufficient energy to cause ink to be ejected from the nozzle.

2. The apparatus of claim 1, wherein said means for varying includes means for varying the amplitude of said preceding pulse.

3. The apparatus of claim 1, wherein said means for varying includes means for varying the width of said preceding pulse.

4. The apparatus of claim 3 wherein said preceding pulse has a pulse width of less than 500 $\mu s$.

5. The apparatus of claim 4, wherein said means for varying the width of said preceding pulse includes a timer.

6. The apparatus of claim 3, wherein said means for varying the width of said preceding pulse includes a timer.

7. The apparatus of claim 1, wherein the polarity of said preceding pulse and said main pulse is the same.

8. The apparatus of claim 1, wherein said preceding pulse and said main pulse have opposite polarities.

9. A process for controlling the size of an ink droplet in an on-demand type ink-jet recording apparatus comprising:

an ink-jet printer head including an ink chamber, an electromechanical transducer coupled to said ink chamber, a nozzle in communication with said ink chamber and from which said ink droplet is to be ejected and an ink supplying passage through which said ink is supplied to the ink chamber; and comprising applying a main electrical pulse to said electro-mechanical transducer to eject an ink droplet, said process further comprising:

variably controlling the position of the meniscus of the ink in the nozzle by applying to said electro-mechanical transducer at least one preceding electrical pulse prior to application of said main pulse, and controlling the energy of said at least one preceding pulse as a function of the desired ink droplet size to be ejected responsive to said main pulse, said at least one preceding pulse having insufficient energy to cause ink to be ejected from the nozzle prior to applying thereto the main pulse.

10. The process of claim 9, wherein said step of controlling the energy of said preceding pulse comprises varying the amplitude of said preceding pulse.

11. The process of claim 9, wherein said step of controlling the energy of said preceding pulse comprises varying the width of said preceding pulse.

12. The process of claim 11, wherein said preceding pulse has a pulse width of less than 500 μs.

13. The process of claim 9, wherein the polarity of said preceding pulse and said main pulse is the same.

14. The process of claim 9, wherein said preceding pulse and said main pulse have opposite polarities.

* * * * *